United States Patent [19]

Gnamm et al.

[11] Patent Number: 5,599,449
[45] Date of Patent: Feb. 4, 1997

[54] TUBULAR ELASTIC FRAME WITH A CONTINUOUS SLOT SPANNED BY A FILTER MATERIAL

[75] Inventors: Bernhard Gnamm; Alexander Bareiss, both of Charleston, S.C.

[73] Assignee: Robert Bosch GmbH, Stuttgart, Germany

[21] Appl. No.: 546,237

[22] Filed: Oct. 20, 1995

[30] Foreign Application Priority Data

Oct. 21, 1994 [DE] Germany ............... 44 37 665.0

[51] Int. Cl.⁶ ................................. B01D 27/08
[52] U.S. Cl. ............... 210/495; 210/497.01; 210/497.2; 55/DIG. 31
[58] Field of Search ............... 55/422, 497, 511, 55/529, DIG. 31; 210/232, 357, 445, 453, 455, 483, 495, 497.01, 497.2

[56] References Cited

U.S. PATENT DOCUMENTS

| | | | |
|---|---|---|---|
| 524,668 | 8/1894 | Hawkins | 210/459 |
| 2,654,097 | 10/1953 | Epstein | 210/495 |
| 3,300,952 | 1/1967 | Cuta | 210/495 |
| 5,102,436 | 4/1992 | Grabowski | 55/DIG. 31 |
| 5,169,524 | 12/1992 | Meiritz et al. | 210/232 |
| 5,422,622 | 1/1996 | Stark et al. | 55/DIG. 31 |

FOREIGN PATENT DOCUMENTS 4030859  4/1992  Germany.

*Primary Examiner*—W. L. Walker
*Attorney, Agent, or Firm*—Edwin E. Greigg; Ronald E. Greigg

[57] ABSTRACT

The invention relates to a cylindrical filter element, which has a longitudinal slot in order to be able to expand the filter element elastically for the purpose of fitting in a circumferential groove. To prevent any fluid from being able to pass unfiltered through the longitudinal slot, the invention proposes to configure end faces, which delimit the longitudinal slot, such that they run in the secant direction or in the peripheral direction. This has the advantage that the end faces overlap and therefore the longitudinal slot is closed when the filter element is installed.

8 Claims, 2 Drawing Sheets

5,599,449

TUBULAR ELASTIC FRAME WITH A CONTINUOUS SLOT SPANNED BY A FILTER MATERIAL

PRIOR ART

The invention derives from a tubular filter element as set forth hereinafter.

A filter element of this type is known from DE 40 30 859 A1. The known filter element is tubular, it is flowed through in the radial direction. In order to be able to insert the filter element into a circumferential groove of a tubular body, the known filter element is provided with a continuous longitudinal slot. The filter element can be elastically expanded and thereby slid in the axial direction over the tubular body until it arrives in the groove of the latter.

The known filter element has the drawback that its longitudinal slot lies open when the diameter at the base of the groove into which the filter element is inserted is larger than the inside diameter of the filter element. As a result of the open longitudinal slot, fluid is able to flow unfiltered through the filter element. Such a diameter variance can arise as a result of production tolerances.

ADVANTAGES OF THE INVENTION

As a result of a configuration, according to the invention, of the filter element the ends of the filter element which delimit the slot overlap in the installed state. This has the advantage that the filter element according to the invention enables the length to be equalized in the peripheral direction and thereby compensates for diameter variances of the filter element in relation to the part to which it is to be fitted.

A refinement as set forth herein produces the effect that the outer end of the filter element, which end delimits the slot, is forced against the inner end when the filter element is inserted from the outside into a circumferential (shaft) groove. The slot is thereby closed in a sealed manner.

The design also produces such a sealed closure of the slot when a filter element is inserted from the inside into a circumferential borehole groove.

To enable the surfaces delimiting the slot to come to bear one against the other as envisaged when the filter is installed and to prevent the outer peripheral face of the filter element from coming to bear, at the end of smaller radius, against the inner peripheral face of the end of larger radius, the radial variance of the two ends of the filter element, which ends delimit the slot, is less than the thickness of the filter element in the radial direction.

One embodiment of the invention, having a filter material which is closed in the peripheral direction, i.e. is hose-shaped, has the advantage that, even when the slot lies open, fluid passing through the slot is filtered.

BRIEF DESCRIPTION OF THE DRAWINGS

The invention is explained in greater detail below with reference to illustrative embodiments represented in the drawing, in which.

DETAILED DESCRIPTION OF THE ILLUSTRATIVE EMBODIMENTS

Figure 1:
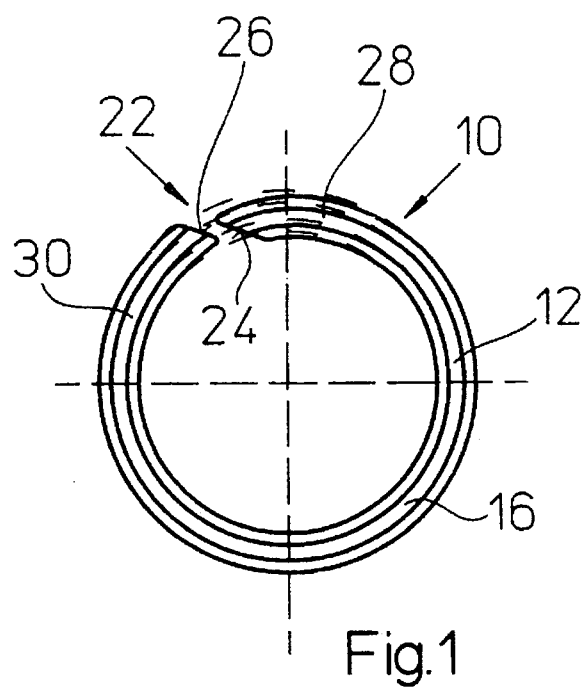
FIG. 1 shows a first embodiment of a filter element according to the invention in a side view.
Figure 2:
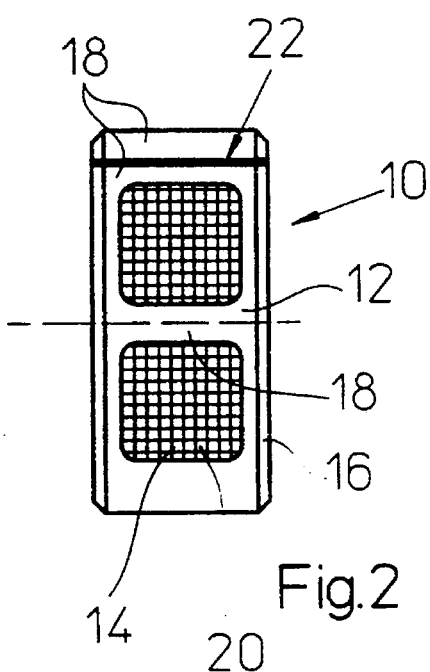
FIG. 2 shows the filter element from FIG. 1 in projection.

The tubular filter element 10 according to the invention, which is represented in FIGS. 1 and 2, comprises an elastic frame 12, which is provided with a filter material 14. The frame 12 has two circular rings 16, which are disposed coaxially next to each other at a distance apart and are interconnected by crosspieces 18 which are integral to them. The filter material 14 is placed in openings 20 in the frame 12 which are delimited by the rings 16 and the crosspieces 18. The filter material 14 is disposed on a peripheral face of the filter element 10. The frame 12 consists of an elastic synthetic material with which margins of the filter material 14 are extrusion-coated.

At a point on its periphery, the frame 12 has a slot 22 which is continuous in the longitudinal direction and is delimited by two crosspieces 18. As a result of this slot 22, it is possible to expand the filter element 10 elastically or reduce it in diameter in order to be able to fit it, for example, in a circumferential groove located in the outer face of a tubular part or in a bore. Front end faces 24, 26 of the filter element 10, which delimit the slot 22, are disposed in secant planes and are mutually aligned in such a way that, when the slot 22 is closed, they bear flatly one against the other.

In an end region 28 of the filter element 10, which end region adjoins the inwardly directed front end face 24, the radius of the filter element 10 diminishes relative to a cylindrical form represented by dashed lines in FIG. 1. This end region 28 of the filter element 10 is thus located somewhat inward in relation to a cylindrical form. In another end region 30 of the filter element 10, which end region adjoins the outwardly directed front end face 26, the radius increases in the direction of this front end face 26. This end region 30 of the filter element 10 is thus located somewhat outward in relation to a cylindrical form.

Figure 3:
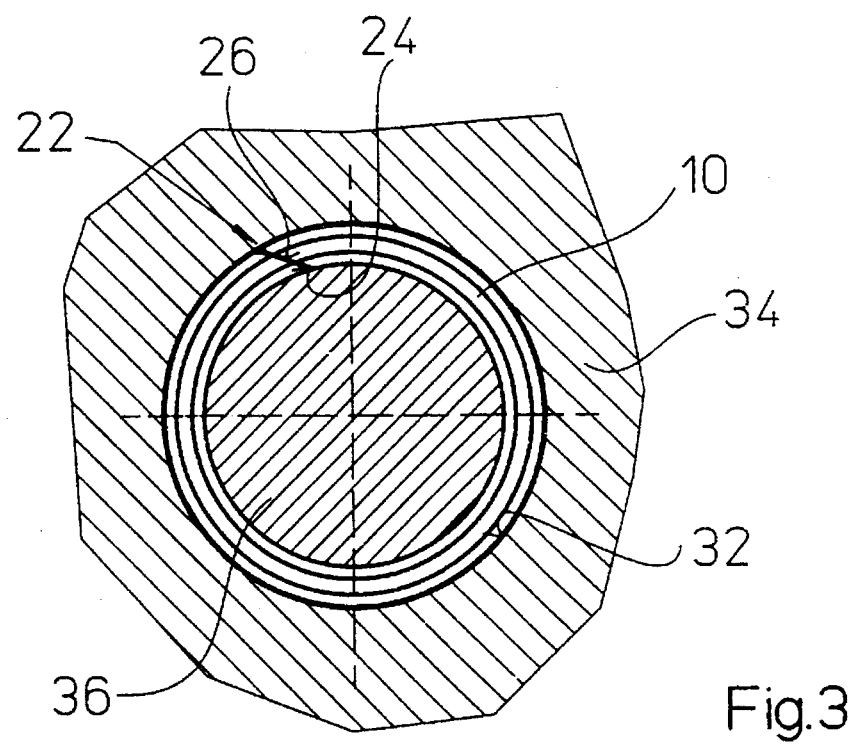
FIG. 3 shows the installed filter element according to FIGS. 1 and 2.

In FIG. 3, the filter element 10 according to the invention is represented installed in an annular gap between a bore 32 in an outer part 34 and a cylindrical inner part 36. For better ease of representation, fluid-supply and drainage ducts are not illustrated in FIG. 3. As a result of the alignment of the front end faces 24, 26 in the secant direction, the two front end faces 24, 26 overlap each other in the peripheral direction when the filter element 10 is installed. This enables the length to be equalized in the peripheral direction, so that the slot 22, even allowing for tolerances for the bore 32 and for the cylindrical inner part 36, is constantly closed when the filter element 10 is installed. As a result of the end regions 28, 30 of the filter element 10, which deviate inwardly and outwardly respectively from the cylindrical form, its front end faces 24, 26, when the filter element 10 is installed, are forced one against the other forming a seal.

Figure 4:
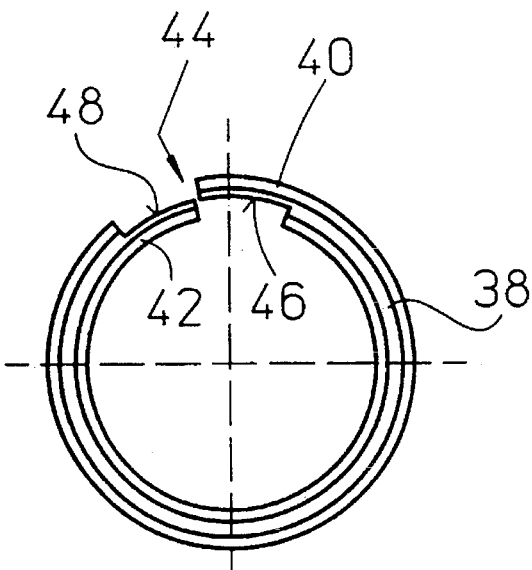
FIG. 4 shows a second illustrative embodiment of the invention.

FIG. 4 shows a second embodiment of a tubular filter element 38 according to the invention, which, at a point on its periphery, is open. End regions 40, 42 of this filter element 38, which adjoin the opening 44, are stepped in construction. Stop faces 46, 48 of the stepped end regions 40, 42, which, when the filter element 38 is installed, bear one against the other forming a seal, run approximately in the peripheral direction. Consequently, an equalization of length in the peripheral direction when the filter element 38 is installed likewise becomes possible without fluid being able to pass through the opening 44, which is closed when the filter element 38 is installed.

Figure 5:
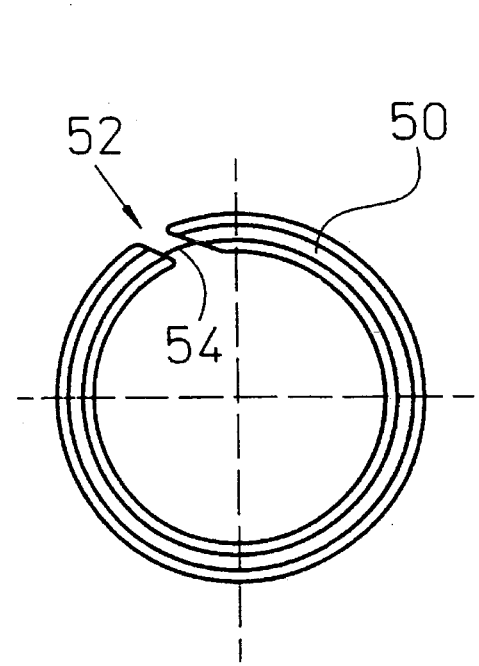
FIG. 5 shows a third illustrative embodiment of the invention.
Figure 6:
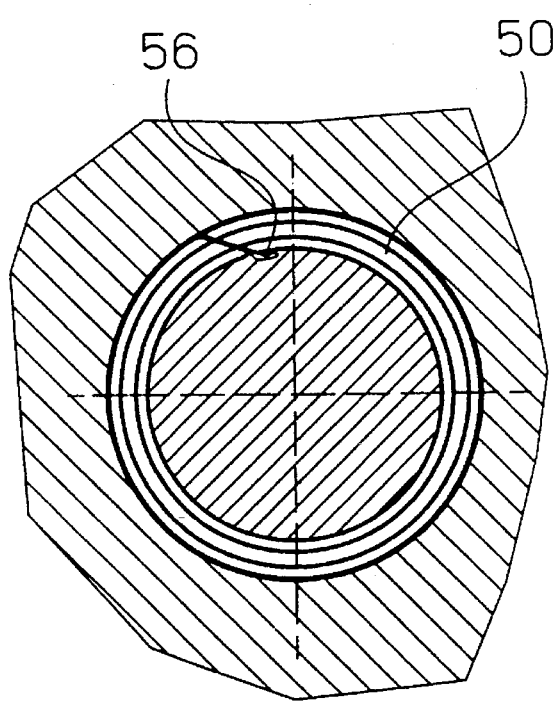
FIG. 6 shows the installed filter element according to FIG. 5.

FIGS. 5 and 6 show a third embodiment of a tubular filter element 50 according to the invention. This filter element 50 likewise has a slot 52 which is continuous in the longitudinal direction. This filter element 50 has a filter material 54 which is hose-shaped, i.e. closed in the peripheral direction, and which spans the slot 52. Fluid is thereby prevented from passing unfiltered through the slot 52 in the radial direction. When the sealing element 50 is installed, that portion of the sealing material 54 which spans the slot 52 is turned over inwardly as a fold 56, as is represented in exaggerated form in FIG. 6.

The foregoing relates to preferred exemplary embodiments of the invention, it being understood that other variants and embodiments thereof are possible within the spirit and scope of the invention, the latter being defined by the appended claims.

We claim:

1. A tubular elastic filter element (10; 50) comprising a frame (12) with an inner radius and an outer radius, said frame (12) including openings (20), filter material (14; 54) mounted in said openings (20) of the frame (12), said frame including a rectilinear slit (22; 52) that is continuous in a longitudinal direction of the filter element (10; 50) that forms two opposing ends, the two radii being unchanged over a circumferential region of the frame (12) and the two ends of the filter element (10; 50) formed by the slit (22; 52) having flat faces (24, 26) that extend obliquely in a secant direction, of which the face (24) on the one end begins at the inner radius of the frame (12) and ends, converging to a point, at the outer radius, while the face (26) of the other end begins at the outer radius of the frame (12) and ends, converging to a point at the inner radius, said filter material (54) spans the slit (52) and is closed in a peripheral direction.

2. The filter element of claim 1, in which the two raddi of the tubular filter element (10) decrease in an end region (28) which is adjacent to the slit (22) and ends at the face (24) that converges to a point at the outer radius.

3. The filter element of claim 2, in which the two raddi of the tubular filter element (10) increase in an end region (30) which is adjacent to the slit (22) and ends at the face (26) converging to a point at the outer radius.

4. The filter element as claimed in claim 2, wherein the change in the raddi in those end regions (28, 30) of the filter element which are contiguous to the slot (22) is smaller in total than a thickness of the filter element (10) in the radial direction.

5. The filter element of claim 1, in which the two raddi of the tubular filter element (10) increase in an end region (30) which is adjacent to the slit (22) and ends at the face (26) converging to a point at the outer radius.

6. The filter element as claimed in claim 5, wherein the change in the raddi in those end regions (28, 30) of the filter element which are contiguous to the slot (22) is smaller in total than a thickness of the filter element (10) in the radial direction.

7. The filter element as claimed in claim 1, wherein the periphery of the filter material (54) is larger than a periphery, corresponding to a nominal diameter, of the filter element (50) in an installed state.

8. The tubular filter element comprises an elastic frame having a slot which is continuous in a longitudinal direction, the said frame being provided with a filter material, wherein the filter material (54) is closed in a peripheral direction and its periphery is larger than a periphery, corresponding to a nominal diameter, of the filter element (50) in an installed state.

* * * * *